United States Patent [19]

Hudson et al.

[11] 3,892,830
[45] July 1, 1975

[54] PRECISE TEMPERATURE ADJUSTMENT OF REHEATED PARISON PREFORMS

[75] Inventors: Jimmie E. Hudson, Bartlesville, Okla.; Jimmy W. Snelson, Orangeburg, N.Y.

[73] Assignee: Phillips Petroleum Company, Bartlesville, Okla.

[22] Filed: Oct. 3, 1973

[21] Appl. No.: 402,983

Related U.S. Application Data

[62] Division of Ser. No. 242,385, April 10, 1972, Pat. No. 3,790,319.

[52] U.S. Cl. ............ 264/94; 264/97; 264/98; 264/327
[51] Int. Cl. .............................................. B29c 17/07
[58] Field of Search ............ 264/89, 90, 92, 94, 96, 264/97, 98, 99, 327; 425/DIG. 208

[56] References Cited
UNITED STATES PATENTS
3,125,619  3/1964  Miller ...................... 425/DIG. 208
3,632,713  1/1972  Seefluth ............................ 264/94 X
3,662,048  5/1972  Turner ............................. 264/98 X
3,775,524  11/1973  Seefluth ........................... 264/98 X

*Primary Examiner*—Jan H. Silbaugh

[57] ABSTRACT

Tubular parison preforms for blow molding generally oval-shaped oriented hollow articles such as bottles are reheated to orientation temperature and the sides of the parison which are to be expanded out along a major axis of a mold are contacted with textured fingers so as to lower the temperature a very small amount. This allows the portion of the parison corresponding to the major axis of the mold to resist stretching and thus compensates for the unequal wall thickness which otherwise results when the parison touches the walls of the mold opposite the minor axis and is thereby chilled.

6 Claims, 5 Drawing Figures

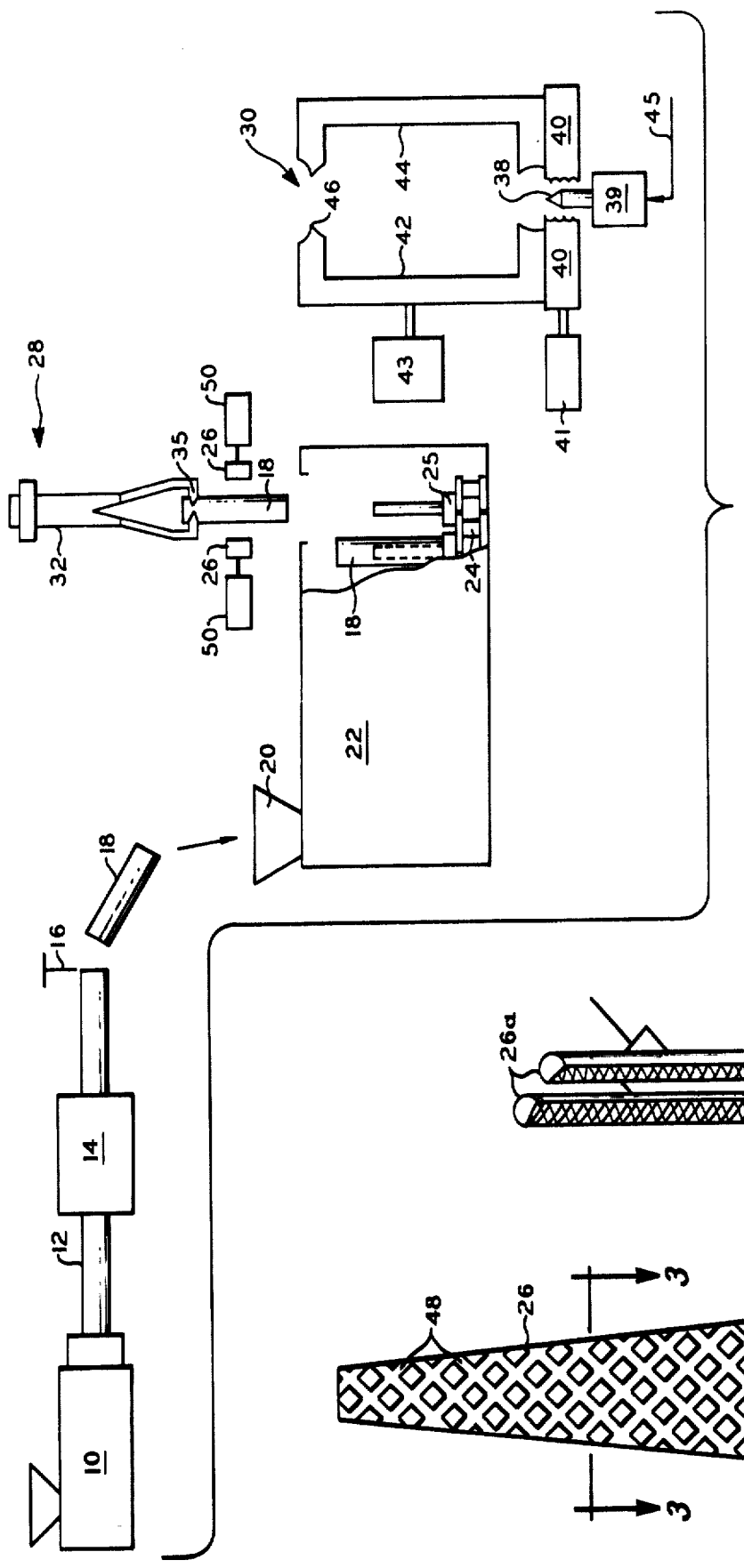
FIG. 1
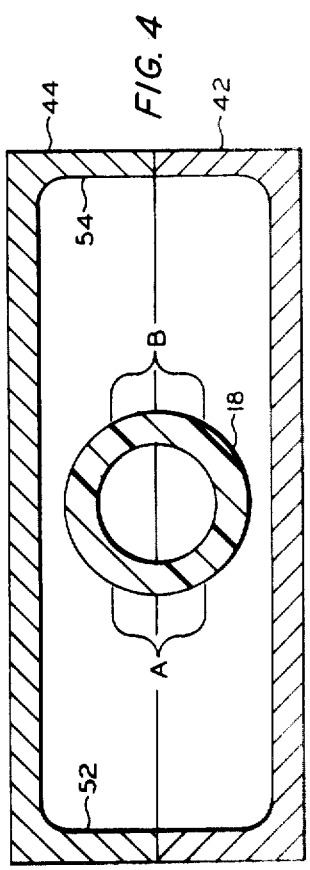
FIG. 4
FIG. 2
FIG. 3
FIG. 5

PRECISE TEMPERATURE ADJUSTMENT OF REHEATED PARISON PREFORMS

CROSS REFERENCE TO RELATED APPLICATIONS

This is a divisional of copending application Ser. No. 242,385 filed Apr. 10, 1972, now U.S. Pat. No. 3,790,319.

BACKGROUND OF THE INVENTION

This invention relates to blow molding oriented hollow articles of irregular shape from reheated parison preforms.

While patents in the blow molding art go back over 100 years, it has been only in the last 15 years or so that blow molding of hollow plastic articles has achieved significant commercial success. Blow molding has traditionally been associated with the formation of bottles of a generally round configuration. In recent years, however, there have been efforts to expand the blow molding techniques to encompass the formation of more sophisticated moldings, including such diverse items as hollow beverage cases having integral dividers and items having integrally molded handles, and the like. With conventional blow molding techniques utilizing a thoroughly molten parison it is a fairly simple matter to compensate for an unsymmetrical configuration of the final product by either of several means. First, the extrusion of the parison can be programmed to give annular areas of greater thickness or a flattened die or bushing can be utilized to give a longitudinal thick section or sections in the parison. In addition, a perfectly cylindrical parison can be extruded and chilled by means of blowing air thereon or contacting with a smooth metal surface to chill the parison from its molten condition to a much lower temperature at which the viscosity is gradually increased. Such a technique is shown in Miller U.S. Pat. No. 3,125,619, for instance. Forming oriented articles from individual cylindrical parison preforms reheated to their orienting temperature, however, presents a different situation. It is virtually impossible to extrude the initial parison preform with the appropriate variations in wall thickness because of the difficulty of indexing these thicker and thinner areas in the final molding operation. Also, there is only a relatively small part of a short arc around the tube which is affected and grossly uneven parisons do not blow predictably. Utilizing smooth surfaced cooling fingers presents a problem in that the parison at orientation temperature is so extremely sensitive to minor temperature variations that it is in some instances virtually impossible to provide apparatus which can mechanically contact the parison and retract the cooling fingers quickly enough to prevent the parison from being cooled to a sufficiently crystalline state that it cannot be molded properly in the cooled areas.

SUMMARY OF THE INVENTION

It is an object of this invention to provide irregularly shaped biaxially oriented hollow articles having wall sections of improved uniformity; it is a further object of this invention to provide an apparatus suitable for selectively adjusting the temperature of a reheated parison preform at orientation temperature; and it is yet a further object to selectively adjust the temperature of a reheated parison preform at orientation temperature.

In accordance with this invention tubular parison preforms are heated to orientation temperature with at least one side portion thereof corresponding to a major axis of the article to be molded being contacted subsequent to said heating but prior to said molding with a textured temperature adjustment finger.

BRIEF DESCRIPTION OF THE DRAWINGS

In the drawings, forming a part hereof, wherein like reference characters denote the like parts in the various views, FIG. 1 is a schematic representation of a blow molding operation utilizing the textured fingers of the invention;

FIG. 2 is a detailed front elevation of a textured temperature adjustment finger;

FIG. 3 is a view along section line 3—3 of FIG. 2;

FIG. 4 is a cross sectional view of an oval-shaped mold with a cylindrical parison disposed therein prior to blowing; and FIG. 5 is a perspective view of fingers in accordance with an alternative embodiment of the invention.

DESCRIPTION OF THE PREFERRED EMBODIMENTS

This invention is applicable to the formation of any irregularly shaped biaxially oriented blow molded article at least a portion of which has a major axis of at least 1.25 times greater than a minor axis. The invention is particularly suitable for articles having a major to minor axis ratio of greater than 2 to 1, for instance from 2.4:1 to 5:1. Exemplary of such articles are oval-shaped bottles and other containers, toys, lamp shades, and the like. For convenience these are described as generally oval-shaped although it is to be understood that this is intended to mean that at least a portion of the article has a ratio of major to minor axis as defined hereinabove and includes rectangular shapes and bottles having a conventional round shape at the top with an oval section at the bottom. Also it is intended to cover articles which are not symmetrical, that is, articles having a bulge on one side, in which case only that one side of the parison which would correspond to this bulge would be contacted with the textured temperature adjustment fingers.

The invention is applicable to the production of these articles from any orientable plastic material. Exemplary polymers from which these parisons can be made are orientable crystalline materials such as polyesters and polymers of at least one mono-1-olefin having 2–8 carbon atoms per molecule and oriented amorphous materials such as poly(vinyl chloride), polystyrene, butadiene-containing polymers and styrene acrylonitrile-containing polymers. Preferred polymers are polymers and copolymers of ethylene, propylene, and butene, particularly polypropylene. The invention is of particular utility with copolymers of propylene and a minor amount of ethylene, having a melt flow of 1 to 3, preferably about 2 as measured by ASTM D 1238-62T, condition L, and a density of 0.900 to 0.905 as measured by ASTM D 1505-63T.

These polymers can be formed into hollow parison preforms by simple extrusion of a pipe which is thereafter severed into individual lengths or by injection molding or by other conventional techniques. The resulting tubular parison is thereafter cooled to ambient temperature and stored preparatory to being heated to orientation temperature.

In the case of crystalline polymers, the orientation temperature to which they are reheated is generally in the range of 1° to 50°, preferably 10° to 30°F below the crystalline melting point. Amorphous polymers have an orientation temperature generally 40° to 225°, preferably 100° to 175°F below the homogeneous melt point. Thus the preferred propylene copolymers would preferably be heated in an air oven at a temperature of about 295°–320°, preferably 305°–308°F with the parison coming to a temperature of about 5°F below the oven temperature.

After the parison has been reheated to orientation temperature the portions corresponding to the major axis of the mold (or the single portion in the case of a bulged asymmetric article) are contacted with the textured temperature adjustment fingers so as to reduce the temperature in the area of contact by an amount within the range of 0.25° to 10°, preferably 0.5° to 5°, more preferably 0.5° to 2°F below that of the rest of the parison but still within the orientation range. Of course there may be some temperature gradient through the wall of the parison and all of these figures are meant to refer to average temperatures.

The textured fingers in accordance with the inventions must have a substantial texture which can be imparted by the use of a series of grooves in the form of a cross hatch, square, or diamond pattern for instance. Mere sandblasting to get a slightly textured surface is not sufficient. Preferably the grooves are at least 1/32 of an inch deep, preferably 1/32 to 1/8 or an inch, more preferably 1/32 to 1/16 of an inch. The grooves should be spaced so that about 40 to 60, preferably about 50 percent of the surface constitutes the lands, and the other portion the grooves.

The textured temperature adjustment fingers of the instant invention can be made of any suitable structural material. Particularly suitable materials are aluminum or brass.

In a more specific embodiment of the invention, instead of using a single textured temperature adjustment finger on each side, a series of parallel fingers are used which allows even more precise adjustment of the temperature to point only a fraction of a degree below that of the surrounding material.

Referring now to the drawings, particularly FIG. 1, there is shown in schematic representation a blow molding apparatus utilizing the textured temperature adjustment fingers of the instant invention. Extruder 10 forms a tubular extrudate 12 which passes to cooling and sizing zone 14 and thence to cutting means 16 where it is cut into individual open end parison preforms 18 which fall into loading hopper 20 of oven 22. Oven 22 is a circulating air oven having a continuous chain 24 with parison support means 25 for conveying parisons 18 therethrough in an upright manner.

Parison transfer mechanism designated generally by reference character 28 transfers the parisons from oven 22 to the molding station generally designated by reference character 30. At the point in the cycle depicted in FIG. 1, gripping means designated generally by reference character 32 has grasped the outer end of the parison by means of clamp members 35. Textured temperature adjustment fingers 26 are shown preparatory to being closed onto the sides of parison 18 corresponding to the major axis of the resulting article. Contact time between fingers 26 and the parison is generally as short as it is mechanically feasible to provide. Generally, this contact time will be within the range of 0.001 to 1 second, preferably 0.1 to 0.5 second. Thereafter gripping means 32 is moved into position above molding station 30 and lowered to position the bottom open end of parison 18 over thread-forming plug 38. Thread-forming jaws 40 then close and optionally plug 38 is advanced axially upward an additional distance into the open end of said parison to thus form the thread and/or neck area. Gripping means 32 then moves axially upward again, thus stretching the parison between thread-forming jaws 40 and clamp members 35. This stretching operation terminates just as the gripping means clears above the top of mold halves 42 and 44. Mold halves 42 and 44 then converge with leading edges 46 of said mold halves severing the parison which is sealed adjacent thereto. Fluid pressure is then introduced via line 45 to expand said parison into conformity with the mold cavity to form a biaxially oriented bottle. During this time gripping means 32 is raised to its uppermost height and rotated into position over a scrap receiving means wherein clamp members 35 open to deposit the severed end of parison 18. Additional rotation of transfer mechanism 28 brings it over oven 22 preparatory to being lowered to grasp another parison, etc. Members 26 could, of course, be positioned so as to contact parison 18 at the point at which member 32 has transferred the parison into position just above molding station 30 preparatory to lowering same.

The above operations are carried out sequentially so that the parison remains at orientation temperature during the stretching and blowing.

The mold halves then open and the thus formed bottle is removed. Plug 38 is moved axially upward and downward by means of cylinder 39. Jaw means 40 are moved into and out of engagement with the parison by means of cylinder 41 and mold halves 42 and 44 are opened and closed by means of air cylinder 43. Air is introduced into the interior of the parison to effect expansion of same via line 45 which feeds into a hollow core of plug 38.

Now referring to FIG. 2, there is shown a front elevation in detail of a temperature adjustment finger 26 showing cross hatch grooves 48. In the embodiment shown the finger is about 3/16 of an inch wide at the top and ½ inch wide at the bottom with the overall height being 1½ inches. Of course, the size and shape can be varied to fit the individual article being molded. Generally the articles being molded will have a greater difference between the length of the major and minor axis near the middle and bottom thereof because generally the neck will be round or generally round.

FIG. 3 shows a sectional view of temperature adjustment finger 26 showing means 50 to move said fingers quickly into and out of engagement with the parison. Means 50 can be pneumatic cylinder or the like. Finger 26 is shown with a radius corresponding to the radius of the outside diameter of the parison. Generally each finger 26 will encompass about 1/4 of the circumference of the parison although this can be varied to fit individual applications.

Referring now to FIG. 4 there is shown parison 18 which has been contacted by temperature adjustment fingers 26 along portion A corresponding to wall 52 at the end of the major axis of the mold cavity and along portion B corresponding to wall 54 also along the major axis of the mold cavity. Thus on introduction of internal fluid pressure portions A and B will resist expansion to a very slight degree and thus compensate for the reduced stretching normally encountered when the parison contacts the walls at the ends of the minor axis of the mold. It is to be emphasized that the amount of temperature adjustment must be kept very small; otherwise since the polymer is at orientation temperature, it will simply be cooled below the point at which it will stretch significantly which gives an entirely unsatisfactory molding.

FIG. 5 shows an alternative embodiment of the invention wherein temperature adjustment fingers 26a comprise a plurality of parallel members which further facilitates achieving more precise adjustment of the temperature a matter of a fraction of a degree or at the most a couple of degrees Fahrenheit.

It must be kept in mind that, at the temperatures in question, the polymer exhibits elastic as opposed to plastic characteristics and only small fluctuations in temperature can have disastrous effects on the resulting molded article. That is if there is substantial cooling, the cooled portion will not stretch at all and conversely substantial heating of a particular area will result in either the article blowing out and forming a hole in this point or at least achieving no significant orientation. It is to be further emphasized that the uniformity obtained in accordance with the invention relates to more than just a simple maintaining more nearly even wall thickness, although that is important. By achieving substantially even stretching of all portions of the material, it is possible to achieve orientation in all portions of the parisons and this has a dramatic effect on strength. For instance, in a conventional blow molding operation utilizing temperatures where the polymer is thoroughly molten, a difference in temperature of as much as 100°F may have only a slight effect on the viscosity, with a resulting slight effect on the resulting wall thickness; for the most part strength would be increased an amount proportionate to the increase in wall thickness. However, operating in accordance with the invention, achieving uniform orientation allows more complete advantage to be taken of the orientation effect which increases the strength a factor of 10 or more over the strength of unoriented material.

Generally the members shown in FIG. 5 will be disposed in a parallel relationship relative to the longitudinal axis of the bottle.

Many conventional parts such as temperature controllers, thermostats, frame members and the like have been omitted from the drawings for the sake of simplicity, but their inclusion is understood by those skilled in the art and is within the scope of the invention.

Calculated Illustrative Embodiment

A predominantly propylene copolymer having a small amount of ethylene therein with a density of 0.902 (ASTM D 1505-63T) and a melt flow of 2 (ASTM D 1238-62T), condition L, and a crystalline melting point of about 320°F is extruded into tubing having an outside diameter of 1.345 inches and a wall thickness of 0.175 inch. The tubing is cooled to room temperature in a vacuum sizing quenching chamber and cut into 6-inch work pieces. These 6-inch lengths are placed in a heating oven such as is shown in FIG. 1, which oven is adjusted to a temperature of 305°-308°F. After about 45 minutes the parisons are removed from the oven and contacted with two temperature adjustment fingers such as are shown in FIG. 2 for a time sufficient to adjust the temperature in the area contacted to an average of about 1°F below that of the rest of the parison. Each finger is 3/16 of an inch wide at the top, ½ inch wide at the bottom and 1½ inches long. The parison is then transferred immediately into position in a molding zone and expanded by internal fluid pressure to give a bottle having a generally round upper neck area and an oval to rectangular body portion as shown in FIG. 4 having an average width along the major axis of the resulting article of about 4¼ inches and an average width along the minor axis of the resulting article of about 1¾ inches. The resulting article is severed along a plane perpendicular to the long axis of the bottle at a point along the widest dimension of the generally oval to rectangular body portion. The walls opposite the major axis are about one-half the thickness of the walls opposite the minor axis. No extremely thin or thick areas are found.

CONTROL

Identical polymer to that of the calculated illustrative embodiment was formed into identical parisons and treated in identical manner except the sides were contacted with smooth surfaced cooling fingers. The resulting bottle had two lumps corresponding to the areas touched by the smooth surfaced cooling fingers. Contact time was reduced to the smallest level mechanically possible on a commercial scale machine with the same results with this particular polymer although it was possible to obtain reasonably satisfactory results with some polymers utilizing a smooth surfaced cooling finger.

While this invention has been described in detail for the purpose of illustration, it is not to be construed to be limited thereby but is intended to cover all changes and modifications within the spirit and scope thereof.

What is claimed is:

1. A method of forming a biaxially oriented hollow article having an irregular configuration wherein at least a portion thereof has a ratio of a major axis to a minor axis of at least 1.25 to 1 comprising:

introducing a cylindrical thermoplastic parison preform into a heating zone;

imparting sufficient heat to bring the entire parison preform to orientation temperature;

thereafter cooling a portion of at least one side of said parison which is to correspond to said major axis to an average of 0.25° to 10°F below the temperature of the rest of the parison but still within the range of orientation temperature by contacting said parison for a time within the range of 0.001 to 1 second with a textured temperature adjustment finger, said textured temperature adjustment finger having grooves at least 1/32 of an inch deep and having 40 to 60 per cent of the surface made up of lands and the remaining portion made up of grooves;

placing said parison in a molding zone with said thus cooled portion of said parison being aligned with a wall across from a major axis of said zone; and creating a pressure differential to expand said parison out into conformity with said zone.

2. A method according to claim 1 wherein said portion of said parison is adjusted to a temperature of 0.5° to 2°F below that of the rest of the parison.

3. A method according to claim 1 wherein said thermoplastic is polypropylene.

4. A method according to claim 1 wherein said thermoplastic is a crystalline copolymer of propylene with a minor amount of combined ethylene, having a density of 0.900 to 0.905 and a melt flow of 1–3.

5. A method according to claim 4 wherein said article is a bottle and wherein said heat is imparted in a circulating air oven adjusted to a temperature of 305°–308°F.

6. A method according to claim 5 wherein said portion of said parison is adjusted to a temperature of 0.5° to 2°F below that of the rest of the parison.

* * * * *